United States Patent
Murray et al.

(10) Patent No.: US 12,248,822 B2
(45) Date of Patent: Mar. 11, 2025

(54) LIFECYCLE MANAGEMENT FOR WORKLOADS ON HETEROGENEOUS INFRASTRUCTURE

(71) Applicant: Hewlett Packard Enterprise Development LP, Houston, TX (US)

(72) Inventors: Bryan P. Murray, Duvall, WA (US); Mark Perreira, Sunnyvale, CA (US); Jayashree Sundarachar Beltur, San Jose, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 778 days.

(21) Appl. No.: 17/534,735

(22) Filed: Nov. 24, 2021

(65) Prior Publication Data

US 2023/0161643 A1    May 25, 2023

(51) Int. Cl.
*G06F 9/455* (2018.01)
*G06F 9/445* (2018.01)
*G06F 9/54* (2006.01)

(52) U.S. Cl.
CPC .......... *G06F 9/541* (2013.01); *G06F 9/44526* (2013.01); *G06F 9/45541* (2013.01)

(58) Field of Classification Search
CPC ... G06F 9/541; G06F 9/44526; G06F 9/45541
See application file for complete search history.

(56) References Cited

U.S. PATENT DOCUMENTS 9,843,531 B2   12/2017 Perreira et al.
10,033,662 B2   7/2018 Gupte et al.
(Continued)

FOREIGN PATENT DOCUMENTS

WO    2020263374 A1    12/2020

OTHER PUBLICATIONS

Christie Koehler, "Detecting and Managing Drift with Terraform," Jun. 7, 2018, pp. 1-14, Retrieved from the Internet on Mar. 9, 2021 at URL: hashicorp.com/blog/detecting-and-managing-drift-with-terraform.
(Continued)

*Primary Examiner* — Brian W Wathen
(74) *Attorney, Agent, or Firm* — Hewlett Packard Enterprise

(57) ABSTRACT

Examples described herein relate to providing pool-based automated lifecycle management of infrastructure via abstracted resources. According to an example, a consumption model is maintained in which heterogeneous infrastructure is represented in a generalized form as logical resource objects, including nodes and pools of the nodes. The nodes have respective node roles indicative of specific functionality the nodes are operable to provide to a workload based on the respective attributes/qualities of the nodes. A state model is maintained through which the logical resource objects are transitioned among states and responsive to which notifications are provided to an application orchestration tool associated with the workload. Interactions by the application orchestration tool with heterogeneous infrastructure utilized by the workload are abstracted by providing an API through which requests to manage a lifecycle of the heterogeneous infrastructure are expressed with reference to the logical resource objects.

20 Claims, 7 Drawing Sheets

(56) References Cited

U.S. PATENT DOCUMENTS

| | | |
|---|---|---|
| 11,194,635 B2 * | 12/2021 | Carlen ............... G06F 9/54 |
| 12,131,044 B2 * | 10/2024 | Potyraj ............ G06F 11/3034 |
| 2018/0159735 A1 | 6/2018 | Beyh |
| 2018/0219728 A1 | 8/2018 | Beyh et al. |
| 2018/0359162 A1 | 12/2018 | Savov et al. |
| 2020/0092166 A1 | 3/2020 | Sharma et al. |
| 2020/0252282 A1 | 8/2020 | Tanna et al. |
| 2021/0019195 A1 | 1/2021 | Aronov et al. |
| 2021/0028993 A1 | 1/2021 | Kavadimatti et al. |
| 2024/0296071 A1 * | 9/2024 | Toal ............... G06F 9/5072 |

OTHER PUBLICATIONS

Dapeng Dong et al., "Separation of Concerns in Heterogeneous Cloud Environments," Apr. 2017, pp. 747-752, SCITEPRESS.

\* cited by examiner

LIFECYCLE MANAGEMENT FOR WORKLOADS ON HETEROGENEOUS INFRASTRUCTURE

BACKGROUND

Lifecycle management for applications and infrastructure may refer to a broad set of activities, including, among others, discovery, provisioning, upgrading, patching, change management, configuration management, and management of security vulnerabilities. Some lifecycle management activities, such as performing upgrades and patch management, have traditionally involved manual, repetitive tasks that are prone to configuration and implementation errors, which are now being addressed by various cloud automation tools and lifecycle management software for performing automated lifecycle management.

Automated lifecycle management may be used to efficiently manage applications in a cloud computing infrastructure. Automated lifecycle management combined with cloud native application design (e.g., applications that are designed to be independent of computing infrastructure lifecycle changes) is the norm for some lifecycle management approaches.

BRIEF DESCRIPTION OF THE DRAWINGS

Aspects described herein are illustrated by way of example, and not by way of limitation, in the figures of the accompanying drawings in which like reference numerals refer to similar elements.

DETAILED DESCRIPTION

Figure 1:
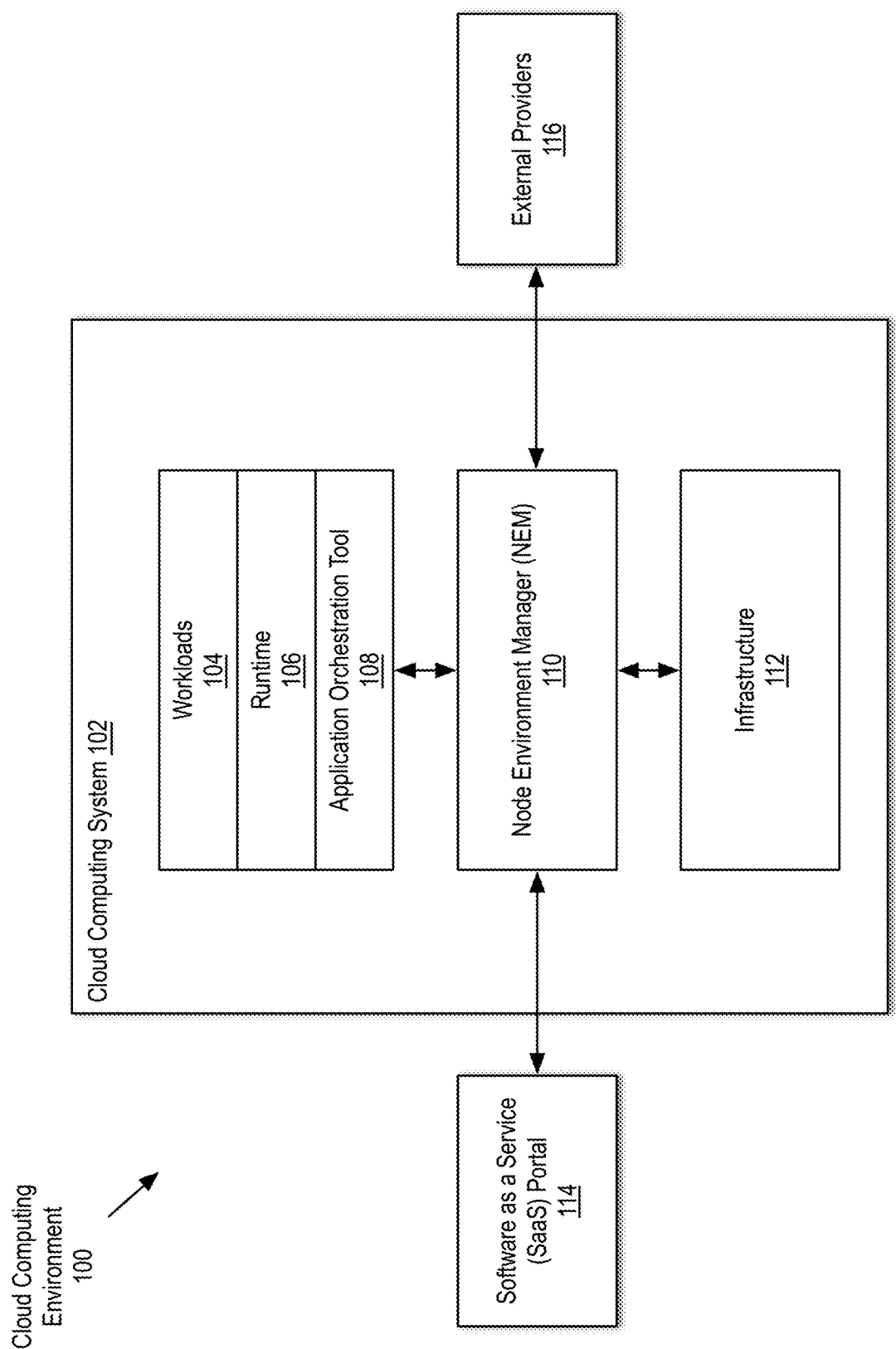
FIG. 1 shows a block diagram of a cloud computing environment in accordance with an example.

Examples described herein relate to providing pool-based automated lifecycle management of infrastructure via abstracted resources. While infrastructure lifecycle management is typically performed independently of an application's lifecycle, there are cases where an application needs to be integrated into the lifecycle of the underlying computing infrastructure that may or may not be cloud-like and cannot be independently managed without regard to the application's lifecycle. An example of this is when the application is a service (e.g., is a service type of application (e.g., Software as a Service (SaaS)) for creating and managing complex computing system architectures, such as clusters. In this case, the lifecycle of the computing infrastructure would need to work in tandem with the application's configuration orchestration. Another example is when the application is stateful, such as a storage service where the underlying computing infrastructure needs to be integrated with the application to guarantee the restoration of persistent state information, as needed, for the storage service in the computing infrastructure.

When an organization desires to provide a cloud experience for on-premise workloads, application orchestrations are exposed to various complexities of the underlying computing infrastructure of the cloud computing environment, including, for example, provisioning mechanisms and resource management tools (e.g., KubeVirt—an open source project, VMWare vCenter, and the like). Additional challenges are faced by application orchestrations in the context of a limited computing environment and/or a computing environment having heterogeneous infrastructure. For example, a site, an installation, or a data center (which may be generally referred to herein as a computing environment) may include a limited number (e.g., 20 to 80) of servers, each providing computing resources (e.g., compute, storage, and/or networking resources), housed within a limited number (e.g., 1 or 2) of racks. The servers available within a particular computing environment may also be manufactured by different vendors, represent different models, and/or have different attributes, also referred to as qualities, which may include, for example, capabilities, capacities and/or configurations.

Additionally, service type applications and/or stateful applications may involve monitoring the status of the underlying infrastructure being utilized for a given service or solution (e.g., Machine Learning Operations as a Service (MLOpsaaS), Container as a Service (CaaS), Virtual Machine as a Service (VMaaS), Storage as a Service (STaaS), and the like) as well as related images to handle various changes (e.g., the availability of an operating system update, a planned outage, or an unplanned outage). In general, it would be desirable to insulate applications from such complexities and infrastructure-specific details to allow, among other things, applications to focus on functionalities and features core to the solution at issue.

As such, in examples described herein, operations on computing infrastructure from the perspective of applications is proposed to be simplified and generalized by introducing a software framework in the form of an intermediate layer logically interposed between the applications and their respective orchestration tools on one side and the computing infrastructure (including associated provisioning mechanisms and resource management tools). According to various examples, a software framework provides pool-based lifecycle management of resources for applications. For example, elements of a computing infrastructure may be managed as groups of similar entities (e.g., compute, storage, networking, potentially having similar attributes or qualities) with consistent automated lifecycle management operations and states.

As described further below, in one example, this framework (which may be referred to herein as a node environment manager (NEM)) provides a resource object and state model system as well as resource configuration and inventory information, an infrastructure plugin framework for integrating bespoke infrastructure tools and management products or cloud services resource management functionality, and an application programming interfaces (API) for resource consumption and lifecycle events. For example, through the consumption API, application orchestrations may indirectly manage and/or manipulate the underlying infrastructure via interactions with logical resource objects (e.g., nodes and pools of nodes).

As part of the NEM framework, a north-bound API is available for normalized acquisition of resources in a cloud computing environment by using a reservation system to acquire abstracted computing resources (e.g., pools, nodes, etc.), a notification mechanism for resource lifecycle changes to trigger integrations with application orchestration tools, and a south-bound API for infrastructure plugins to allow for integration of computing infrastructure tools and services (e.g., via various developed plugins) that support the south-bound API calls. In this manner, application orchestration tools may be provided with a simple API for computing resource acquisition without requiring an understanding of the complex details of the underlying computing infrastructure of the cloud computing environment, provisioning mechanisms, and management tools. Further, complex lifecycle changes, such as an operating system (OS), firmware, or software update (on either bare-metal (BM) machines/servers or virtual machines (VMs)), a planned or failure outage, and untrusted boot/activity, may be made nearly transparent to the application. For example, responsive to notifications from NEM, the application can orchestrate application instance re-configuration without regard to the complexity of the computing infrastructure or management tool or service details.

One or more application orchestration tools may access computing resources in the cloud computing environment via logical pools of nodes represented within a consumption model and acquired through reservations. The application orchestration tools may configure those acquired resources to build instances of applications. Nodes, which are logical in nature, may represent either BM machines or VMs, may be defined to provide specific functionality to an instance of an application based on the node's attributes (e.g., capabilities, capacity and/or configuration, for example, in terms of compute, storage, and/or networking), and may be organized by a NEM into a pool of nodes that are managed automatically and collectively throughout the lifecycle via integrated tools and management products.

In the following description, numerous specific details are set forth in order to provide a thorough understanding of subject matter disclosed herein. It will be apparent, however, to one skilled in the art that implementation of aspects described herein may be practiced without some of these specific details.

The terms "connected" or "coupled", and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

Terminology

If the specification states a component or feature "may," "can," "could," or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an example," "according to an example," and the like generally mean the particular feature, structure, or characteristic following the phrase is included in at least one example of the present disclosure and may be included in more than one example of the present disclosure. Importantly, such phrases do not necessarily refer to the same example.

As used herein, "infrastructure" generally refers to physical computing systems (e.g., rack servers, blade servers, blades, storage arrays, storage servers, hyperconverged platforms, etc.) and/or virtual computing systems (e.g., VMs running on physical computing systems) that are available within a computing environment. Each individual component or element of infrastructure may provide differentiated computing resources (e.g., compute resources (to perform computations), storage resources (to store data), and/or network resources (to communicate data)) for use by workloads running in the computing environment. As noted above, an on-premise computing environment may be heterogeneous in nature (e.g., BM machines and/or VMs having differentiated computing resources) and/or may include a limited number of servers. In some examples, a NEM may maintain an inventory of BM/VM infrastructure at the installation.

A "node" as used herein represents an abstracted element of infrastructure or logical set of one or more computing resources associated with the infrastructure. Depending upon the particular implementation, nodes can represent BM machines or VMs and may be defined to provide specific functionality to an application instance based on the node's attributes (e.g., capabilities, capacity and/or configuration, for example, in terms of compute, storage, and/or networking). In examples described herein, an NEM may organize nodes into groups the lifecycles of which are collectively managed via integrated tools and/or management products. In some examples, the NEM maintains an infrastructure model to track the backing servers (e.g., which rack and which server) in the inventory represented by the nodes in the consumption model.

"Orchestration" generally refers to the automated configuration, management, and/or coordination of computer systems, applications, computing resources, and/or services.

"Application orchestration" or "service orchestration" is the process of automating the deployment, management, scaling, networking, integrating, and availability of applications and/or services for processing or synchronizing data in real-time. In some cases, the applications comprise a plurality of software containers. A container may contain one or more workloads.

An application orchestration tool is a program (typically run by a system administrator in a cloud computing environment) that implements application orchestration.

Cloud Computing Environment

FIG. 1 shows a block diagram of a cloud computing environment 100 in accordance with an example. In the context of the present example, cloud computing environment 100 includes a cloud computing system 102, a SaaS portal 114 through which users may interact with and configure various aspects of the cloud computing system 102, and external providers 116 (e.g., BM providers, trust providers, VM providers, and/or storage providers). The cloud computing system 102 may be located on-premise in a data center or colocation.

In some implementations, infrastructure 112 may be owned by or in possession of a user or user's organization and managed by an infrastructure provider (of which the user or user's organization is a customer). In some implementations, infrastructure 112 may be delivered to the user or user's organization (e.g., installed at a data center or colocation of the user or user's organization) by the infrastructure provider for consumption as-a-service in a pay-per-use financial model. In some implementations, a node environment manager 110 described below may be provided by the infrastructure provider as part of management for consumption as-a-service.

The cloud computing system 102 may run one or more workloads 104. The workloads 104 may be made up of data and applications with infrastructure 112 providing computing resources (e.g., compute, storage, and/or networking) to the workloads 104 to complete tasks. Workloads 104 may interface with runtime 106 (e.g., a runtime environment including an operating system (OS), a virtual machine manager (VMM) or hypervisor, or other system software) to make use of the computing resources within the infrastructure 112. Depending upon the particular site, the infrastructure 112 may include a heterogeneous pool of resources including differentiated servers and/or VM instances as well as other electronic and/or mechanical components (e.g., server racks (not shown), power supplies (not shown), etc.).

In one example, node environment manager (NEM) 110 represents an intermediate software layer logically interposed between application orchestration tools (e.g., application orchestration tool 108) running in cloud computing system 102 and the infrastructure 112. As described further below, NEM 110 may consist of a number of conceptual components, including inventory management, node pool management, node reservation management, automated node provisioning management, and/or automated pool management. For example, in addition to a consumption API, NEM 110 may also provide an inventory API through which an administrative user of the cloud computing system 102 accessing NEM 110 through SaaS portal 114, for example, may manage an inventory of racks and differentiated servers of the infrastructure 112 in order to offer a set of node pools to higher level orchestrators (e.g., application orchestration tool 108).

In an example, application orchestration tool 108 may be used by the administrative user to configure the automated lifecycle management of infrastructure 112 for workloads 104.

NEM 110 may provide a simplified API for resource consumption to allow application orchestration tool 108 to easily reserve, acquire and manage computing resources for the workloads 104 that are backed by infrastructure 112 of cloud computing system 102 without requiring knowledge of the complex details to perform computing resource management (especially for BM resources). As described further below, the layer of abstraction provided by the consumption API allows workloads to acquire nodes without knowing whether the underlying servers (e.g., providing the computing resources) are BM machines or VMs, and by describing the node's role in a data-driven fashion when defining a pool. Further, NEM 110 may provide notifications to workloads 104 regarding state changes of the computing resources when nodes or pools are involved in lifecycle changes (e.g., as a result of the availability of OS or software (SW) or firmware updates, planned or unplanned outages, untrusted activity, etc.). Application orchestration tool 108 can then resolve the state changes through NEM 110 by reserving and acquiring new nodes and removing old nodes from their pools (e.g., by immutable node handling), which may eliminate workload configuration drift and, by extension, may eliminate reconfiguring instances of workloads.

In an example, NEM 110 may also automate the provisioning of nodes in the background. For example, nodes with a defined role (e.g., as part of a predetermined workload configuration) can be built in advance of their acquisition (e.g., prior to or responsive to reservation) to facilitate prompt availability for usage by workloads 104 once acquired by application orchestration tool 108. This may improve node acquisition performance because building BM nodes is typically time consuming. This feature can also provide a benefit for building VM nodes, which are generally thought of as fast to provision, but depending on the complexity of the OS/SW in their respective runtime environments, may also be slow to build.

Node Environment Manager (NEM)

Figure 2:
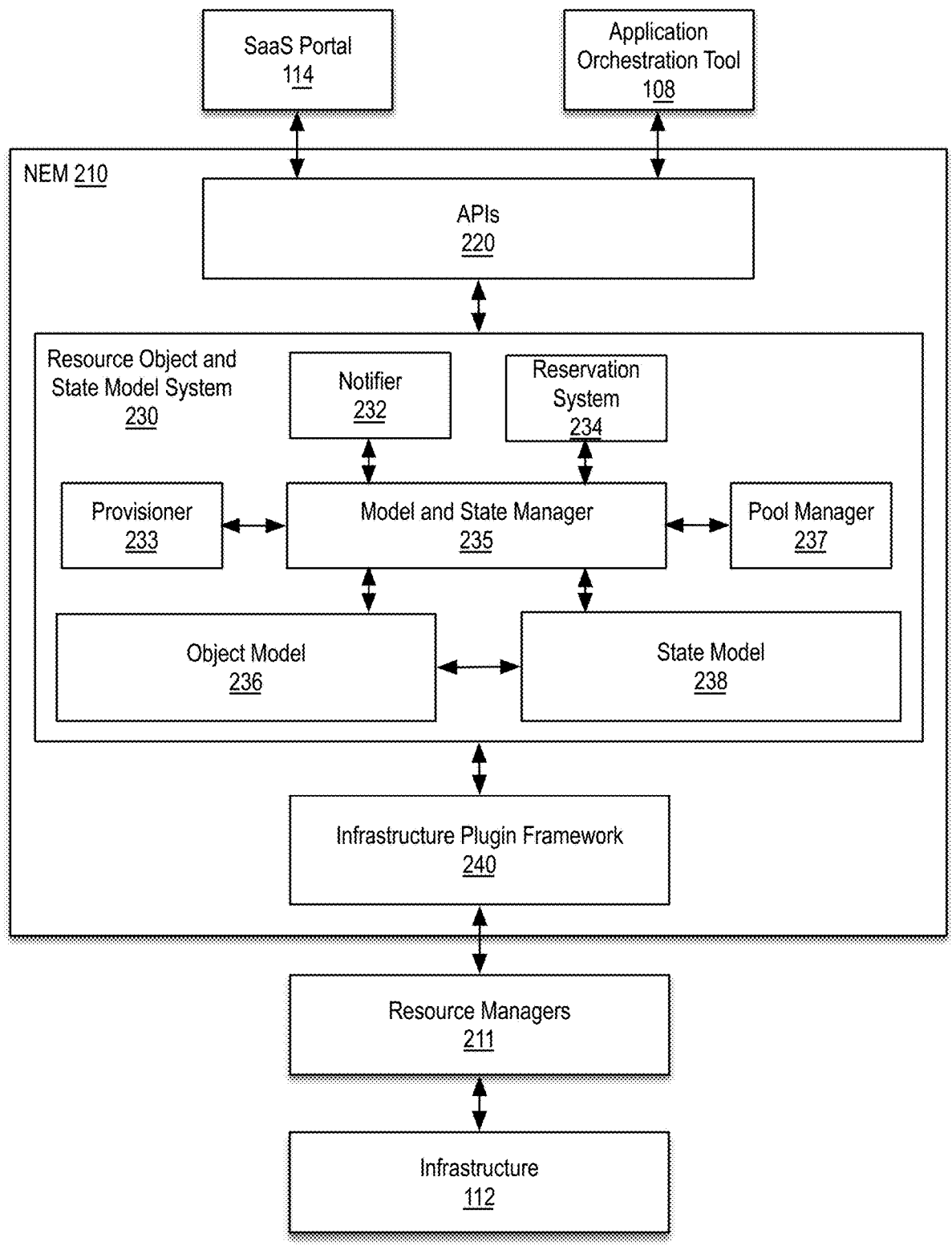
FIG. 2 shows a block diagram of a node environment manager (NEM) in accordance with an example.

FIG. 2 shows a block diagram of a node environment manager (NEM) 210 in accordance with an example. NEM 210 represents a non-limiting example of NEM 110 of FIG. 1. In the context of the present example, NEM 210 includes north-bound APIs 220 (e.g., a consumption API, an inventory API, and a solution configuration API described further below), a resource object and state model system 230, and an infrastructure plugin framework with a south-bound API 240.

The infrastructure plugin framework 240 may be used to generalize and harmonize various tools, management products and/or cloud APIs into state and lifecycle definitions associated with the NEM 210. For example, the infrastructure plugin framework 240 may integrate physical resource and infrastructure management tools (e.g., resource managers 211 via BM plugins (e.g., bare metal provisioning tools), trust plugins (e.g., Keylime—an open source project, or other trusted platform module (TPM) remote boot attestation and runtime integrity measurement solutions), VM plugins (e.g., KubeVirt, Kubernetes KVM virtualization management, or other virtualization tools), and/or storage plugins), and the like. While such tools and solutions may alternatively be embedded within the NEM 210, in some implementations, making use of a plugin approach has the advantage of allowing the NEM 210 to focus on object/state management and making applications simpler and easier to build and maintain. Additionally, with the plugin approach, the NEM 210 may be more easily expanded with more lifecycle management capabilities over time and when integrated with the automated lifecycle of application orchestrations can provide for flexible and durable application and infrastructure architectures.

The resource object and state model system 230 is shown including a model and state manager 235, an object model 236, a state model 238, a notifier 232, a provisioner 233, a reservation system 234, a pool manager 237. In an implementation, the object model 236 and the state model 238 may be implemented in GO (a statically typed, compiled programming language), deployed as stateless Kubernetes pods for scalability, accessed via representational state transfer (REST) API calls, and persisted in a database. As will be described further below with reference to FIG. 3, the object model 236 may have multiple tiers including: (i) an inventory model, in which the inventory of BM/VM infrastructure available within the cloud computing system (e.g., cloud computing system 102) for use by workloads (e.g., workloads 104) may be maintained; (ii) a solution model, containing a solution configuration mixed with custom settings associated with tools/products integrated with the NEM 210, for example, via the infrastructure plugin framework 240, for a given solution; and (iii) a consumption model, including a set of logical objects (e.g., nodes and pools of nodes) that may be used to indirectly manipulate the actual computing infrastructure at runtime by application orchestration tools (e.g., application orchestration tool 108).

Based on the object model 236, either through REST API calls (e.g., to APIs 220) or NEM background processes, the persisted logical resource objects may be automatically transitioned through states as defined by the state model 238 which can result in notifications (e.g., generated by the notifier 232) to application orchestration tools via APIs 220 and/or calls to the infrastructure plugin framework 240 to invoke appropriate bespoke management tools or cloud infrastructure APIs.

As will be described further below with reference to FIG. 4, the model and state manager 235 may be responsible for orchestrating state changes associated with logical resource objects (e.g., nodes and pools of nodes) due to actions taken or operations performed by application orchestration tools, administrative users, and/or the resource managers 211 associated with infrastructure plugins within the infrastructure plugin framework 240. Under the direction of the model and state manager 235, the state model 238 may persist states associated with the logical resource objects.

The reservation system 234 may be responsible handling reservation requests, for example, made via a consumption API 220. Node reservation management may be used in conjunction with node pools to ensure availability and acquisition (potentially with availability time estimates) of nodes for performance of lifecycle implementations (e.g., deploying nodes for use by a workload and removing nodes currently being used by a workload, i.e., immutable node management). In some examples, a reservation may be made for a desired number of nodes on a pool to ensure that a task (e.g., creating a workload control plane or scaling out a workload) can be accomplished without running out of nodes before the task is completed. Further details regarding various example types of reservations and various example types of actions that may be performed via the reservation system 234 are described further below with reference to FIG. 3.

The provisioner 233 may be responsible for automated node provisioning management. In one example, automated node provisioning management includes ensuring that nodes not belonging to any node pool (available nodes) and conforming to a defined node role are kept in a provisioned state with the latest operating system image/firmware/bios settings for that type of node. Upon initial installation within the computing environment, all nodes may be imaged to make sure they have the image specified for the solution and model type. Subsequently, when a new image is made available for a model type, the inventory may be updated with the current image. All available nodes not acquired and belonging to an existing pool may be recycled to make sure that when a workload requests a node, the node always has the latest image designed for the model type of the node. As described further below, workloads can decide when they are ready to update the image on their acquired nodes belonging to their node pool(s), and over time may evacuate a node and replace it with an available node from the inventory.

The pool manager 237 may be responsible for automated pool management. In an example, automated pool management includes the automated management of node pools integrated with workload lifecycle management processes to ensure nodes and/or node pools can stay updated or be removed for outage either on command or via a schedule. As described further below, a pool state may reflect whether any nodes belonging to the pool are to be updated or are due for maintenance. In this manner, workload lifecycle automation can iterate through the pool nodes to either cycle through an update process or remove the node from the pool to perform maintenance. Once all nodes in the Pool reflect a "normal" state, the pool state may return to the "normal" state. Further details regarding various example types of node/pool states and transitions among the states are described further below with reference to FIG. 4.

The various functional units (e.g., the APIs 220, the notifier 232, the reservation system 234, the provisioner 233, the model and state manager 235, and the pool manager 237) of the NEM 210 described above with reference to FIG. 2 and the processing described below with reference to the flow diagrams of FIGS. 5-6 may be implemented in the form of executable instructions stored on a non-transitory machine readable medium (e.g., a random access memory (RAM), a read-only memory (ROM), an electrically erasable programmable read-only memory (EEPROM), a flash memory, a disk drive, or the like) and executed by a hardware-based processing resource (e.g., a microcontroller, a microprocessor, central processing unit core(s), an application-specific integrated circuit (ASIC), a field programmable gate array (FPGA), or the like) and/or in the form of other types of electronic circuitry. For example, the processing may be performed by one or more computer systems of various forms (e.g., servers, blades, desktop computers, laptop computers), such as the computer system described with reference to FIG. 7 below.

Object Model

Figure 3:
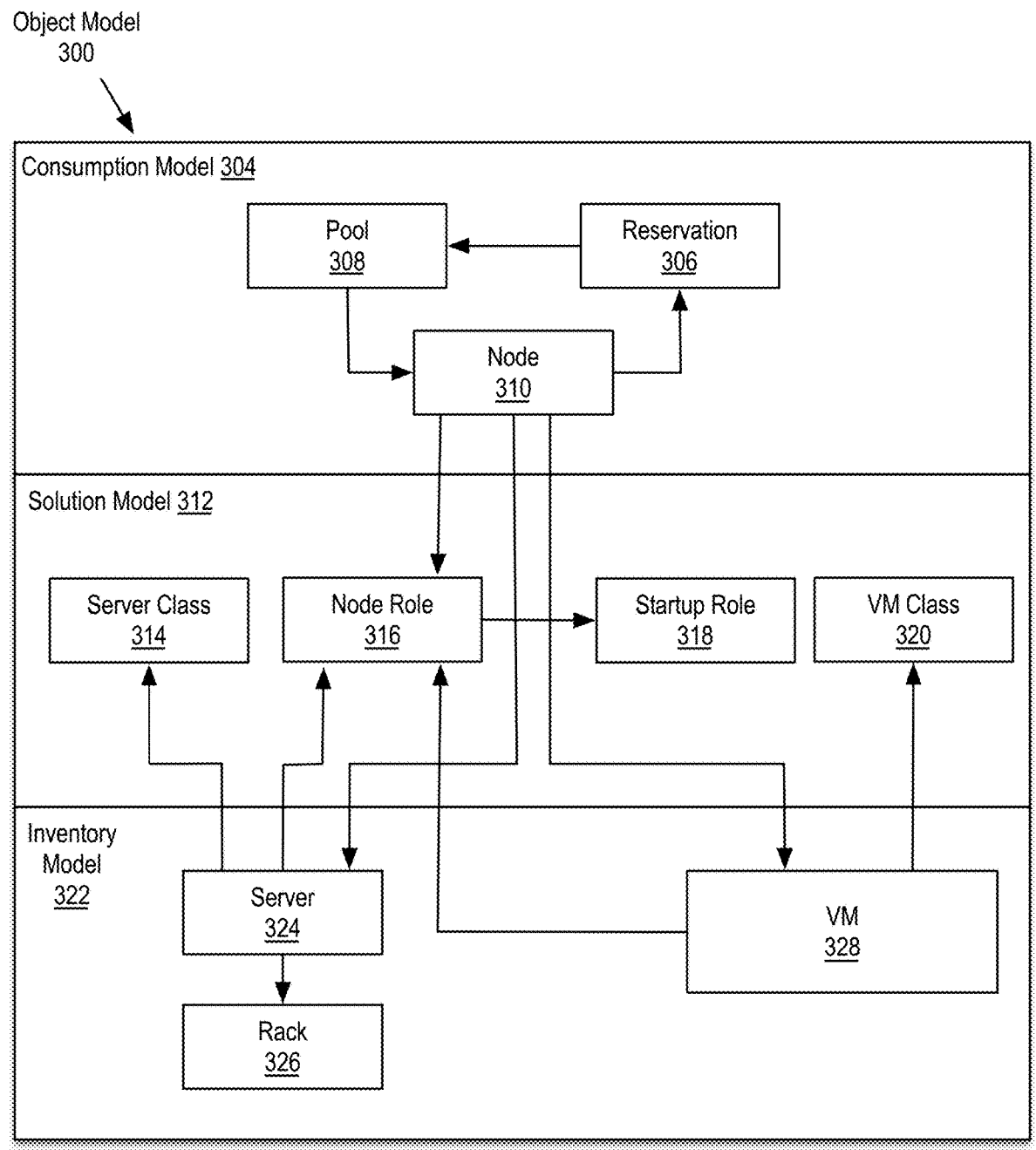
FIG. 3 shows a diagram illustrating an object model in accordance with an example.

FIG. 3 shows a diagram illustrating an object model 300 in accordance with an example. The object model 300 represents a non-limiting example of the object model 236 of FIG. 2. The object model 300 may serve as an abstract and streamlined persistent model used by a NEM (e.g., NEM 210) for describing elements of infrastructure (e.g., infrastructure 112). The object model 300 may also be used by the NEM for and acquiring or releasing elements of infrastructure. The object model, based on the definition of pools of logical resource objects (e.g., nodes (e.g., node 310) and pools (e.g., pool 308) of nodes), allows for the specification of qualities or attributes of a node via a node or instance typing system or can allow for decorative aspects that are applied to nodes (e.g., network connections, connected storage volumes, etc.) as they are acquired and assigned to a pool. Computing resources may be used in groups, in which one or more aspects of compute's resource qualities (e.g., CPU type, memory size, server model, device type, etc.) may be core while others (e.g., storage resources, block storage, volumes, network resources, networks, virtual network infrastructure components) may be contextual based on the usage of the core resource.

In the context of the present example, object model 300 includes three tiers, including a consumption model 304, a solution model 312, and an inventory model 322. The consumption model is shown including reservations (e.g., reservation 306) and a set of logical resource objects (e.g., nodes (e.g., node 310) and pools (e.g., pool 308) of nodes) that may be used to indirectly manipulate the actual computing infrastructure at runtime by application orchestration tools (e.g., application orchestration tool 108). In the consumption model 304, a reservation 306 may be made for a set of one or more nodes resulting in the creation of a pool 308 of one or more nodes 310. A consumption API (e.g., one of APIs 220) may support create, read, update, and delete (CRUD) operations on nodes, pools, and reservations. In addition, other management operations (e.g., list) and lifecycle implementations (deploy, scaling, etc.) may be provided.

In some examples, reservations (e.g., reservation 306) may be one of multiple reservation types to allow lifecycle management implementations to balance the needs of the lifecycle operation and performance of the lifecycle operation against the impact to node availability in the computing environment. For example, reservations may be specified as immediate, deferred high impact, deferred low impact, and deferred recycled. An immediate reservation is appropriate for high priority tasks (e.g., creating the management plane for a Kubernetes cluster where it is best if all nodes are available at once). In one example, creating an immediate reservation will fail if there are fewer servers currently provisioned than requested by the reservation. Creating a deferred high impact or deferred low impact reservation will fail if the total number of servers (provisioned or unprovisioned) with the same node role as the pool is less than the number requested. Such a failure likely means more nodes should be added to the NEM 210 inventory in order to satisfy the reservation request. A deferred high impact reservation may first reserve provisioned servers and then obtain any additional servers to be provisioned on demand to satisfy the request from unprovisioned servers. This type of reservation is appropriate for medium priority tasks (e.g., scaling out a workload). A deferred low impact reservation may first reserve unprovisioned servers and obtain all remaining servers to satisfy the request from provisioned servers. This type of reservation is good for tasks for which time is not an important consideration, for instance, an image update of nodes in a running workload. Reservations may have a specified duration. If a reservation is not satisfied within the duration, the reservation may timeout, the reservation may be deleted, and the remaining unacquired servers may be made available to other reservations. Those nodes that were acquired prior to the timeout of the reservation may remain in the pool.

The solution model 312 may be used to define and persist node criteria (e.g., in terms of attributes) and management of like nodes that can be used for solution workloads' lifecycle implementations. The attributes may be defined for the solution and made available via the solution management API to orchestrators and IT personnel that will create and manage pools. Higher level orchestrators can then make use of nodes from the pool knowing that they will have the desired qualities/characteristics to fulfill the defined node roles without needing to care about the backing server of the node, where the node is located, how the node is imaged, or what image is on the node. In this manner, application developers are able to focus on responding to lifecycle states notified via the NEM and reconfiguring their solution workloads accordingly.

The solution model 312 may also be used to specify solution configuration and/or custom settings associated with tools/products integrated with the NEM. The solution model 312 may be tailored to a given solution to address the different types of processing performed by the solution workloads (e.g., workloads 104).

In the context of the present example, solution model 312 is shown including class objects (e.g., a server class 314 and a VM class 320), a node role 316, and a startup role 318. The class objects may be used to describe a classification of a resource (e.g., a server model and configuration number or a VM resource configuration). Each node may be associated with a particular role (e.g., the node role 316). The number and types of roles are specific to the type of solution and may be defined by an administrative user through a SaaS portal (e.g., SaaS portal 114) that invokes a solution management API (e.g., one of APIs 220), which may in turn perform appropriate CRUD operations on objects within the solution model 312. For purposes of illustration, in the context of implementing a storage solution, examples of node roles may include that of a gateway node, a storage protocol translator node, and a data storage node. Other solutions may define node roles more generally (e.g., Kubernetes master node vs. Kubernetes worker node). The node role 316 may include a startup role that describes the startup configuration (e.g., server boot configuration) for the associated resource. In some implementations, criteria may be established for minimum capabilities, capacities and/or configurations (e.g., in terms of compute resources, storage resources, and/or storage resources) for a node of a given role. For example, in connection with an MLOps solution, an administrative user may specify a desire for a graphics processing unit (GPU) and/or a minimum number of CPU cores for an Inferencing Node that will be used to perform inference processing.

The inventory model 322 may be used to define and persist infrastructure details for the purpose of selecting and creating infrastructure for solution workload deployment. An Information Technology (IT) administrator or a higher-level orchestrator may directly or indirectly via the SaaS portal make use of the inventory API (e.g., one of APIs 220) to initialize an inventory with information about the racks within the infrastructure 112 and the servers housed by the racks.

Changes to the infrastructure associated with the computing environment (e.g., computing environment 100) should be logged into the inventory API to keep the online inventory up to date, for example, with the inventory of BM/VM infrastructure available within the computing environment. The inventory model 322 may also be used to track the current image for each node role. The current image to be used for node role in the solution model 312 may be established when the solution is released. Over time, as new images are made available to address issues (e.g., security vulnerabilities) and/or provide enhancements, the inventory API may be used to track the latest image for each node role that should be used for the solution.

In the context of the present example, inventory model 322 is shown including objects representing a server 324, a VM 328, and a rack 326. The server 324 may have a particular server class (e.g., server class 314) and a particular node role (e.g., node role 316) and may be associated with a particular rack (e.g., rack 326) housing the corresponding physical server. Similarly, the VM 328 may have a particular VM class (VM class 320) and be associated with a particular node role (e.g., node role 316). Using this three-tier model, a given node (e.g., node 310) may be mapped to the backing server (BM or VM) and vice versa.

State Model

Figure 4:
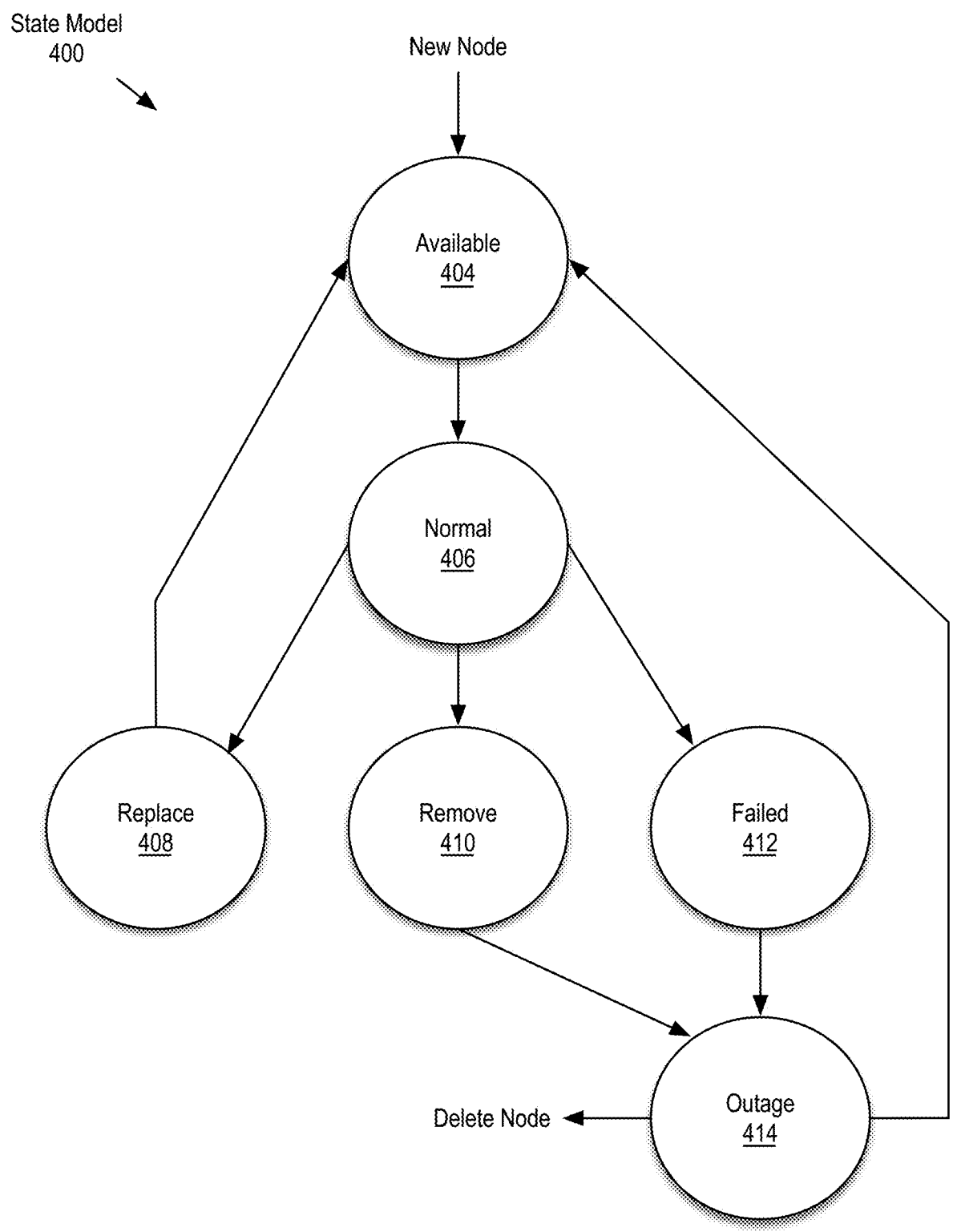
FIG. 4 shows a diagram illustrating a state model in accordance with an example.

FIG. 4 shows a diagram illustrating a state model 400 in accordance with an example. The state model 400 represents a non-limiting example of the state model 238 of FIG. 2. The state model 400 may be used by a NEM (e.g., NEM 210) to represent the current state of logical resource objects (e.g., nodes and pools of nodes). In one example, state transitions within the state model 400 are determined by the model and state manager, persisted via the state model, and then used to trigger: (i) infrastructure plugin functionality, notifications to workloads (e.g., workloads 104), for example, via application orchestration tools, and (iii) potentially additional orchestrations.

The NEM may employ an immutable node approach which means that state changes such as updates, reboots, trust violations, outages or failures are handled by workload-based orchestration by releasing (deleting) the node from its pool. This deletion of a node from a pool may trigger further state changes and additional predetermined orchestrations within the NEM, for example, the delete processing described in Table 1 (below). Use of the state model 400 simplifies workload-based orchestration relationships to state changes of logical resource objects. For example, as illustrated by Table 1 (below), workload-based orchestration can be structured to respond to state changes amplified at the pool-level (e.g., amplified may mean the highest priority state among all node states within a pool may be used for that pool, thereby simplifying the identification of pools and nodes to be processed), identify the node at issue within the pool, perform appropriate pre-processing (e.g., pool expansion, workload evacuation, etc.), post-processing (e.g., pool cleanup) and release and acquisition of resources as dictated by the state change. In one example, a predetermined set of pre-processing and/or post-processing operations to be performed on a pool or a node may be established by an administrative user for each node state.

In one example, a model and state manager (e.g., model and state manager 235) implemented within the NEM, may be responsible for determining and orchestrating state changes associated with logical resource objects (e.g., nodes and pools of nodes) resulting from actions taken or operations performed by application orchestration tools (e.g., application orchestration 108), administrative users, and/or infrastructure plugins. In the context of the present example, the node state may be set to an available state 404, a normal state 406, a replace state 408, a remove state 410, a failed state 412, or an outage state 414. In an example, an immediate mode flag may also be part of the node state to indicate the degree of immediacy of action to be taken for replace and remove states.

When a new node is created, either through inventory changes or consumer reservation, within NEM, the underlying server is provisioned accordingly (e.g., in the case of a BM server) and the node starts in the available state 404. In the available state 404 the node is provisioned and ready for use by a workload but is not yet associated with a pool. When the node is assigned to a pool, the node is transitioned to a normal state 406. From the normal state 406, the node can transition to the replace state 408, the remove state 410, or the failed state 412.

The node may be transitioned to the replace state 408, for example, responsive to a determination that the node is to be replaced either immediately (e.g., immediate mode is true) or at the convenience of the workload (immediate mode is false). The immediate mode may be set to true when the replacement should be performed immediately, for example, after release of a hotfix (e.g., in which an urgent patch is to be applied to a server in the workload) and the server should be updated and rebooted immediately. The immediate mode may be set to false when the replacement may be performed at the convenience of the workload, for example, when the replacement state is in accordance with a regularly scheduled maintenance window. Responsive to deletion of the node from its pool, for example, by the application orchestration tool 108 via the consumption API and upon successful completion of deletion processing (e.g., reimaging, restarting, and BIOS configuration), the node may be placed back in the available state 404.

The node may be transitioned to the remove state 410, for example, responsive to a determination that the node is to be removed either immediately (e.g., immediate mode is true) or at the convenience of the workload (immediate mode is false). The immediate mode may be set to true when the removal should be performed immediately, for example, due to an unplanned outage or a trust violation. The immediate mode may be set to false when the removal may be performed at the convenience of the workload, for example, when the removal state is in accordance with a regularly scheduled maintenance window. Responsive to deletion of the node from its pool, for example, by the application orchestration tool 108 via the consumption API and upon successful completion of deletion processing (e.g., reimaging), the node may be placed into the outage state 414 pending completion of examination by an IT administrator.

The node may be transitioned to the failed state 412, for example, responsive to a determination that the backing server has failed or the trust server has been compromised. Responsive to a node being placed into the failed state 410, the NEM may automatically delete the node and automatically transition the node and backing server to the outage state 414.

As noted above, a node may transition from the remove state 410 or the failed state 412 to the outage state 414. In the context of the present example, nodes in the outage state 414 are not automatically reimaged and placed into the available state 404. Rather, the IT administrator is expected to examine the backing server and approve it for reuse before the node may be placed back into the available state 404. From the outage state 414, the IT administrator may delete the node (e.g., if the failure cannot be remediated) or return it to the available state 404 (e.g., upon successful remediation of the failure).

In the context of the present example, NEM logical resource object states have a priority hierarchy (e.g., in Table 1 (below), the states are listed in an example order of increasing priority from lowest priority at top to highest priority at bottom) and pool state is amplified in priority order. In an example of pool state amplification, a state of a given pool (pool state) may be determined based on the most severe state of the respective states of the nodes (node state) within the given pool. In this manner, workload-based orchestrations may efficiently poll or listen to pool states (e.g., of a relatively small number of pools, typically less than five) to trigger state change orchestrations rather than polling or listening at a node-level (e.g., of a typically much larger number of nodes).

TABLE 1

Example Node States and Delete Processing Responsive to Deletion of the Node from its Pool

| Node State | Immediate Mode | Delete Processing | Intent | Examples |
| --- | --- | --- | --- | --- |
| Normal | N/A | N/A | Normal operating state of a node. | Node is associated with a pool |
| Replace | False | 1. Image<br>2. Restart | 1. Node needs replacement within a | 1. Image update (update/upgrade) |

TABLE 1-continued

Example Node States and Delete Processing Responsive to Deletion of the Node from its Pool

| Node State | Immediate Mode | Delete Processing | Intent | Examples |
|---|---|---|---|---|
| | | 3. Firmware | regularly scheduled maintenance window.<br>2. Workload can be evacuated.<br>3. Pool can be expanded to replace node or node can be recycled. | 2. Trust violation. |
| Replace | True | 1. Image<br>2. Restart<br>3. Firmware | 1. Node needs immediate replacement.<br>2. Workload can be evacuated.<br>3. Node should be recycled. | 1. Image update/reboot (hot fix)<br>2. Trust violation. |
| Remove | False | 1. Image<br>2. Examine | 1. Node needs removal within a regularly scheduled maintenance window.<br>2. Workload can be evacuated.<br>3. Pool needs expansion to remove node, node cannot be recycled. | 1. Outage (scheduled). |
| Remove | True | 1. Image<br>2. Examine | 1. Node needs immediate removal.<br>2. Workload can be evacuated.<br>3. Pool needs expansion to remove node, node cannot be recycled. | 1. Outage (immediate)<br>2. Trust violation. |
| Failed | Forced True | | 1. Backing server has failed and the node was immediately deleted by NEM.<br>2. Workload is lost and needs rebuilding.<br>3. Pool needs cleanup of failed node and expansion to ensure pool scale. | 1. Monitored server failure.<br>2. Trust—server compromised. |

NEM Processing

Figure 5:
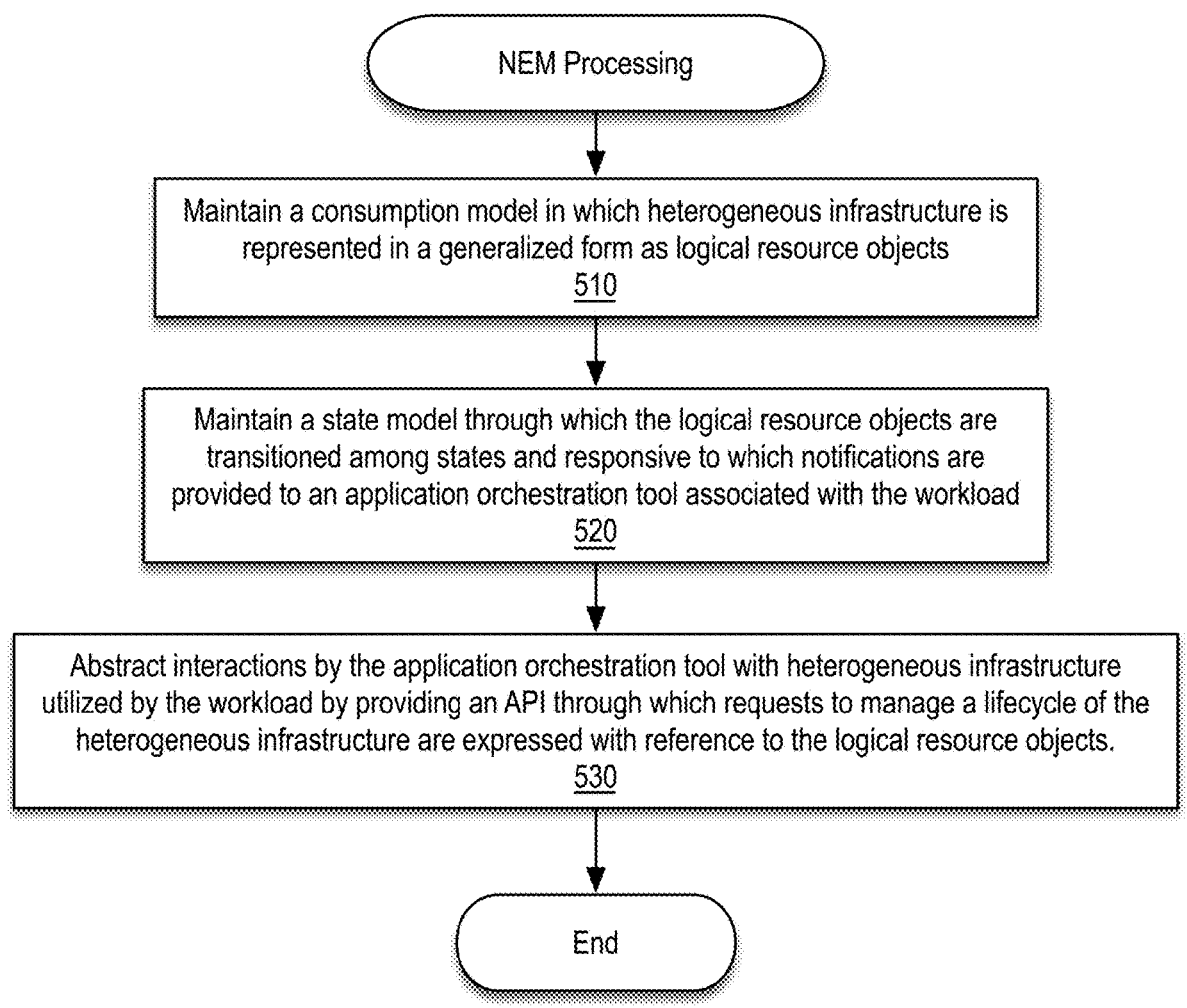
FIG. 5 shows a flow diagram illustrating processing performed by a NEM in accordance with an example.

FIG. 5 shows a flow diagram illustrating processing performed by a NEM in accordance with an example. The processing may be implemented using, for example, without limitation, the NEM 210 of FIG. 2 to facilitate life cycle management for workloads (e.g., workloads 104) on heterogeneous infrastructure (e.g., infrastructure 112).

At block 510, a consumption model is maintained in which heterogeneous infrastructure is represented in a generalized form as logical resource objects. In one example, the logical resource objects include nodes and pools of nodes. Each node may have a node role (e.g., node role 316), for example, defined within a solution model (e.g., solution model 312) of an object model (e.g., object model 300) of the NEM. The respective node roles may be indicative of specific functionality the nodes are operable to provide to a workload (e.g., one of workloads 104) based on the respective attributes of the nodes. The attributes of the nodes may be expressed in terms of respective compute configuration, storage, and/or networking resources of the nodes.

At block 520, a state model is maintained through which the logical resource objects are transitioned among multiple states. In response to transitions of the logical resource objects, notifications may be provided to an application orchestration tool (e.g., application orchestration tool 108) associated with the workload. The multiple states and transitions may be as described above with reference to FIG. 4.

At block 530, interactions by the application orchestration tool with elements of the heterogeneous infrastructure that are utilized by the workload are abstracted by providing a consumption API (e.g., one of APIs 220) through which requests to manage a lifecycle of the heterogeneous infrastructure are expressed with reference to the logical resource objects. For example, as described above with reference to FIG. 3, the consumption API may support various CRUD operations, management operations, and lifecycle implementations on nodes and pools of nodes.

Figure 6:
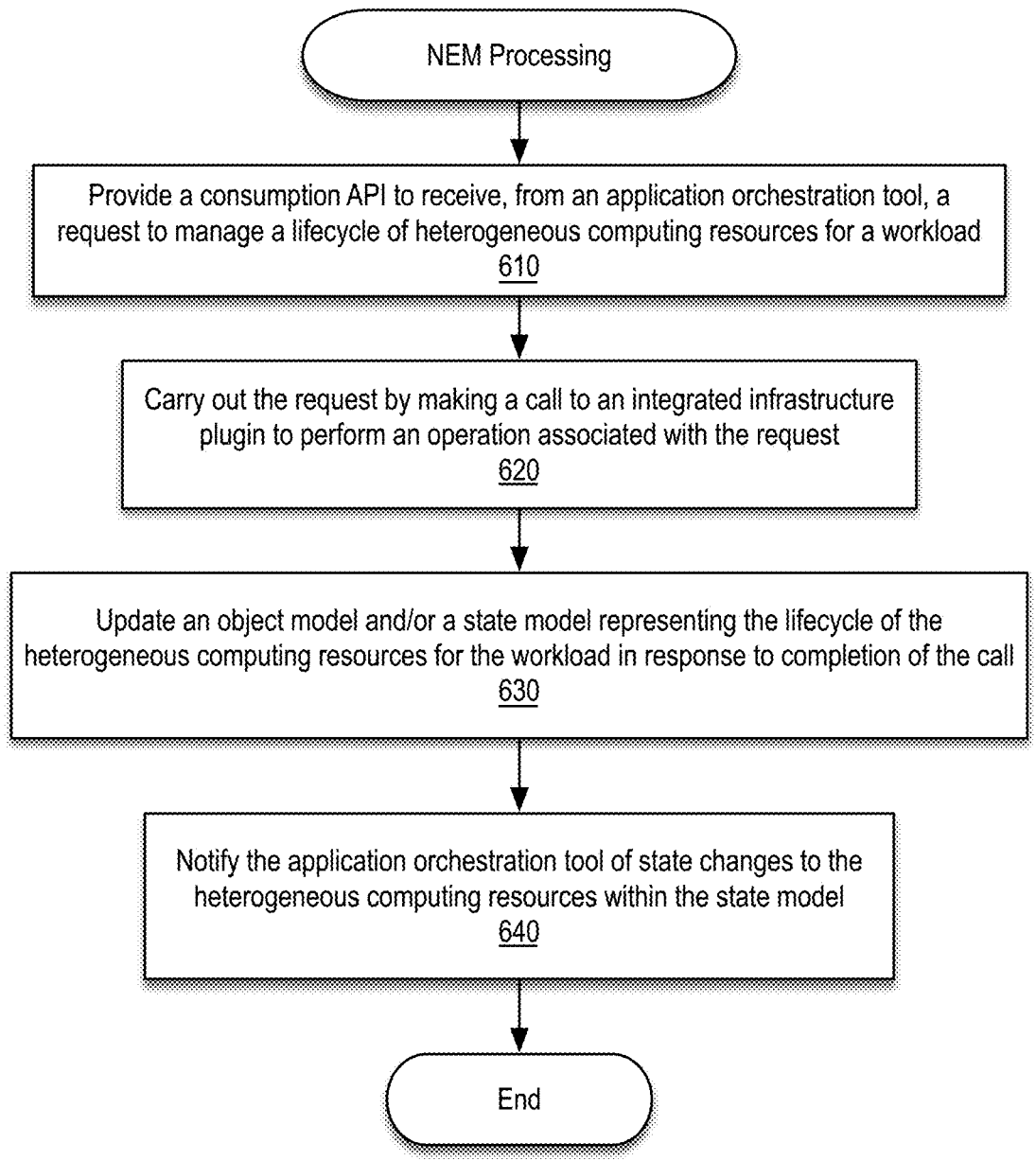
FIG. 6 shows a flow diagram illustrating processing performed by a NEM in accordance with another example.

FIG. 6 shows a flow diagram illustrating processing performed by a NEM in accordance with another example. The processing may be implemented using, for example, without limitation, the NEM 210 of FIG. 2 to facilitate life cycle management for workloads (e.g., workloads 104) on heterogeneous computing resources within an infrastructure (e.g., infrastructure 112).

At block 610, a consumption API is provided to receive, from an application orchestration tool (e.g., application orchestration tool 108), a request to manage a lifecycle of heterogeneous computing resources for a workload. In an example, the application orchestration tool may use the consumption API to indirectly manage and/or manipulate the underlying infrastructure via interactions with logical resource objects (e.g., nodes and pools of nodes).

At block 620, the request is carried out by making a call to an integrated infrastructure plugin to perform an operation associated with the request. For example, creation of a set of nodes or reservation of a set of nodes for association with a particular pool may trigger the NEM to immediately or in the background cause a BM provisioning tool or a virtualization tool, as the case may be, to provision corresponding BM or VM infrastructure.

At block 630, in response to completion of the call, an object model and/or a state model are updated that represent the lifecycle of the heterogeneous computing resources for the workload. For example, responsive to completion of the provisioning of the BM or VM infrastructure, the reserved nodes may be transitioned from an available state (e.g., available state 404) to a normal state (e.g., normal state 406), depending on the state of the node.

At block 640, the application orchestration tool is notified of state changes to the heterogeneous computing resources within the state model. For example, as described above with reference to FIG. 4, the application orchestration tool may be notified (e.g., via automatic notifications from a notifier (e.g., notifier 232) or REST-based polling) regarding node state changes indicative of a need to replace, remove or recover a failed node (e.g., as a result of performance of a hotfix, the availability of an image update, or regularly scheduled maintenance or due to detection of a server failure).

While in the context of the examples described with reference to FIGS. 5-6, a number of enumerated blocks are included, it is to be understood that other examples may include additional blocks before, after, and/or in between the enumerated blocks. Similarly, in some examples, one or more of the enumerated blocks may be omitted or performed in a different order.

Computer System

Figure 7:
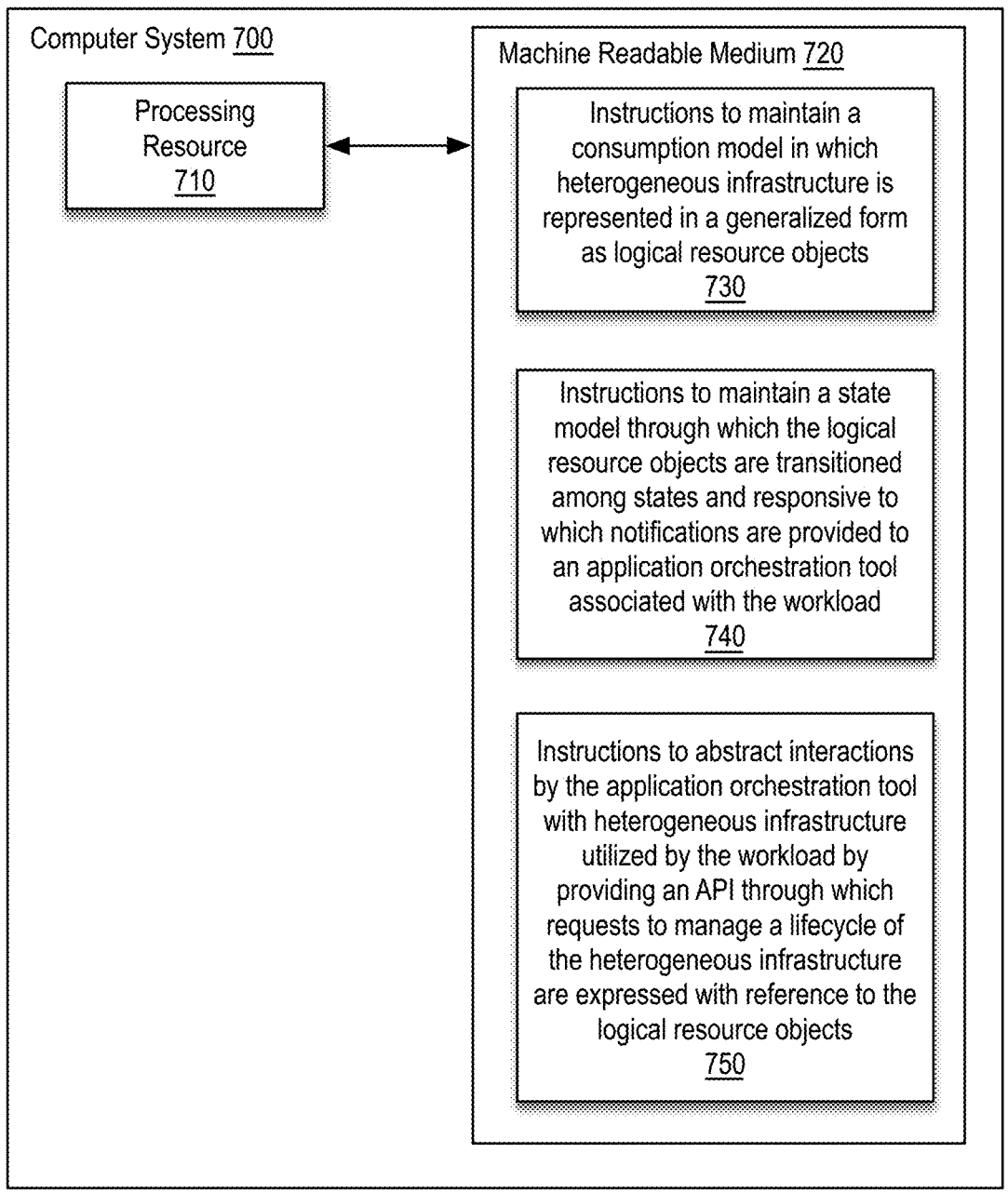
FIG. 7 shows a block diagram of a computer system in accordance with an example.

FIG. 7 shows a block diagram of a computer system in accordance with the first example. In the example illustrated by FIG. 7, computer system 700 includes processing resource 710 coupled to non-transitory, machine readable medium 720 encoded with instructions to perform one or more processes described herein. Computer system 700 may be a server, a cluster of servers, a computer appliance, a workstation, a converged system, a hyperconverged system, or the like. Computer system 700 may be included among infrastructure to be managed (e.g., infrastructure 112) within a particular computing environment (e.g., cloud computing environment 100). In other examples, computer system 700 may be in a cloud (e.g., public cloud) and in communication with the infrastructure to be managed (e.g., infrastructure 112) or may be a management server within a same data center as the infrastructure to be managed.

Processing resource 710 may include a microcontroller, a microprocessor, CPU core(s), GPU core(s), an ASIC, an FPGA, and/or other hardware device suitable for retrieval and/or execution of instructions from machine readable medium 720 to perform the functions related to various examples described herein. Additionally, or alternatively, processing resource 710 may include electronic circuitry for performing the functionality of the instructions described herein.

Machine readable medium 720 may be any medium suitable for storing executable instructions. Non-limiting examples of machine readable medium 720 include RAM, ROM, EEPROM, flash memory, a hard disk drive, an optical disc, or the like. The machine readable medium 720 may be a non-transitory medium, where the term "non-transitory" does not encompass transitory propagating signals. Machine readable medium 720 may be disposed within computer system 700, as shown in FIG. 7, in which case the executable instructions may be deemed "installed" or "embedded" on computer system 700. Alternatively, machine readable medium 720 may be a portable (e.g., external) storage medium, and may be part of an "installation package." The instructions stored on machine readable medium 720 may be useful for implementing at least part one or more of the methods described herein.

In the context of the present example, machine readable medium 720 is encoded with a set of executable instructions 730-750. It should be understood that part or all of the executable instructions and/or electronic circuits included within one block may, in alternate implementations, be included in a different block shown in the figures or in a different block not shown.

Instructions 730, upon execution, may cause processing resource 710 to maintain a consumption model in which heterogeneous infrastructure is represented in a generalized form as logical resource objects, including nodes and multiple pools of the nodes. In one example, instructions 730 may be useful for performing block 510 of FIG. 5.

Instructions 740, upon execution, may cause processing resource 710 to maintain a state model through which the logical resource objects are transitioned among multiple states and responsive to which notifications are provided to an application orchestration tool associated with the workload. In one example, instructions 740 may be useful for performing block 520 of FIG. 5.

Instructions 750, upon execution, may cause processing resource 710 to abstract interactions by the application orchestration tool with heterogeneous infrastructure utilized by the workload by providing an API through which requests to manage a lifecycle of the heterogeneous infrastructure are expressed with reference to the logical resource objects. In one example, instructions 750 may be useful for performing block 530 of FIG. 5.

In the foregoing description, numerous details are set forth to provide an understanding of the subject matter disclosed herein. However, implementation may be practiced without some or all these details. Other implementations may include modifications and variations from the details discussed above. It is intended that the following claims cover such modifications and variations.

What is claimed is:

1. A method comprising:
   maintaining a consumption model in which heterogeneous infrastructure is represented in a generalized form as logical resource objects, including nodes and a plurality of pools of the nodes, wherein the nodes have respective node roles indicative of specific functionality the nodes are operable to provide to a workload based on the respective attributes of the nodes;
   maintaining a state model through which the logical resource objects are transitioned among a plurality of states and responsive to which notifications are provided to an application orchestration tool associated with the workload; and
   abstracting interactions by the application orchestration tool with a subset of the heterogeneous infrastructure utilized by the workload by providing an application programming interface (API) through which requests to manage a lifecycle of the subset of the heterogeneous infrastructure are expressed with reference to the logical resource objects.

2. The method of claim 1, further comprising carrying out the requests by making calls to integrated infrastructure plugins to perform operations associated with the requests.

3. The method of claim 2, wherein the integrated infrastructure plugins comprise a bare metal provisioning tool and a virtualization tool.

4. The method of claim 1, further comprising notifying the application orchestration tool of state model changes.

5. The method of claim 1, wherein the respective attributes are expressed in terms of respective capabilities, capacities or configurations of the nodes.

6. The method of claim 1, further comprising providing a reservation system through which the nodes are associated with the plurality of pools.

7. The method of claim 6, wherein association of the nodes with the plurality of pools facilitates management of the nodes as groups with consistent automated lifecycle management operations and states.

8. The method of claim 1, further comprising, as part of a background process and prior to association with the plurality of pools, provisioning a subset of the nodes having a particular node role to facilitate prompt availability for usage by the workload.

9. A system comprising:
a processing resource; and
a non-transitory computer-readable medium, coupled to the processing resource, having stored therein instructions that when executed by the processing resource cause the processing resource to:
provide a consumption application programming interface (API) to receive, from an application orchestration tool, a request to manage a lifecycle of heterogeneous computing resources for a workload;
carry out the request by making a call to an integrated infrastructure plugin to perform an operation associated with the request;
update an object model or a state model representing the lifecycle of the heterogeneous computing resources for the workload in response to completion of the call; and
notify the application orchestration tool of state changes to the heterogeneous computing resources.

10. The system of claim 9, wherein the instructions further cause the processing resource to provide availability of the heterogeneous computing resources for workloads managed by the application orchestration tool via a reservation system.

11. The system of claim 10, wherein the reservation system associates the heterogeneous computing resources with a pool to facilitate management of the heterogeneous computing resources as a group with consistent automated lifecycle management operations and states.

12. The system of claim 9, wherein the integrated infrastructure plugin comprises a bare metal provisioning tool or a virtualization tool.

13. A non-transitory machine-readable medium storing instructions, which when executed by a processing resource of a computer system, cause the processing resource to:
maintain a consumption model in which heterogeneous infrastructure is represented in a generalized form as logical resource objects, including nodes and a plurality of pools of the nodes, wherein the nodes have respective node roles indicative of specific functionality the nodes are operable to provide to a workload based on the respective attributes/qualities of the nodes;
maintain a state model through which the logical resource objects are transitioned among a plurality of states and responsive to which notifications are provided to an application orchestration tool associated with the workload; and
abstract interactions by the application orchestration tool with a subset of the heterogeneous infrastructure utilized by the workload by providing an application programming interface (API) through which requests to manage a lifecycle of the subset of the heterogeneous infrastructure are expressed with reference to the logical resource objects.

14. The non-transitory machine-readable medium of claim 13, wherein the instructions further cause the processing resource to carry out the requests by making calls to integrated infrastructure plugins to perform operations associated with the requests.

15. The non-transitory machine-readable medium of claim 14, wherein the integrated infrastructure plugins comprise a bare metal provisioning tool and a virtualization tool.

16. The non-transitory machine-readable medium of claim 14, wherein the instructions further cause the processing resource to notify the application orchestration tool of state model changes.

17. The non-transitory machine-readable medium of claim 14, wherein the respective attributes/qualities are expressed in terms of respective capabilities, capacities and/or configurations of the nodes.

18. The non-transitory machine-readable medium of claim 14, wherein the instructions further cause the processing resource to make use of a reservation system to associate the nodes with the plurality of pools.

19. The non-transitory machine-readable medium of claim 18, wherein association of the nodes with the plurality of pools facilitates management of the nodes as groups with consistent automated lifecycle management operations and states.

20. The non-transitory machine-readable medium of claim 14, wherein the instructions further cause the processing resource to, as part of a background process and prior to association with the plurality of pools, provision a subset of the nodes having a particular node role to facilitate prompt availability for usage by the workload.

* * * * *